July 20, 1965  J. B. LINDSAY  3,195,994
METHOD AND MEANS OF PRODUCING DOUBLE WALLED CONTAINERS
Filed May 22, 1962  2 Sheets-Sheet 1
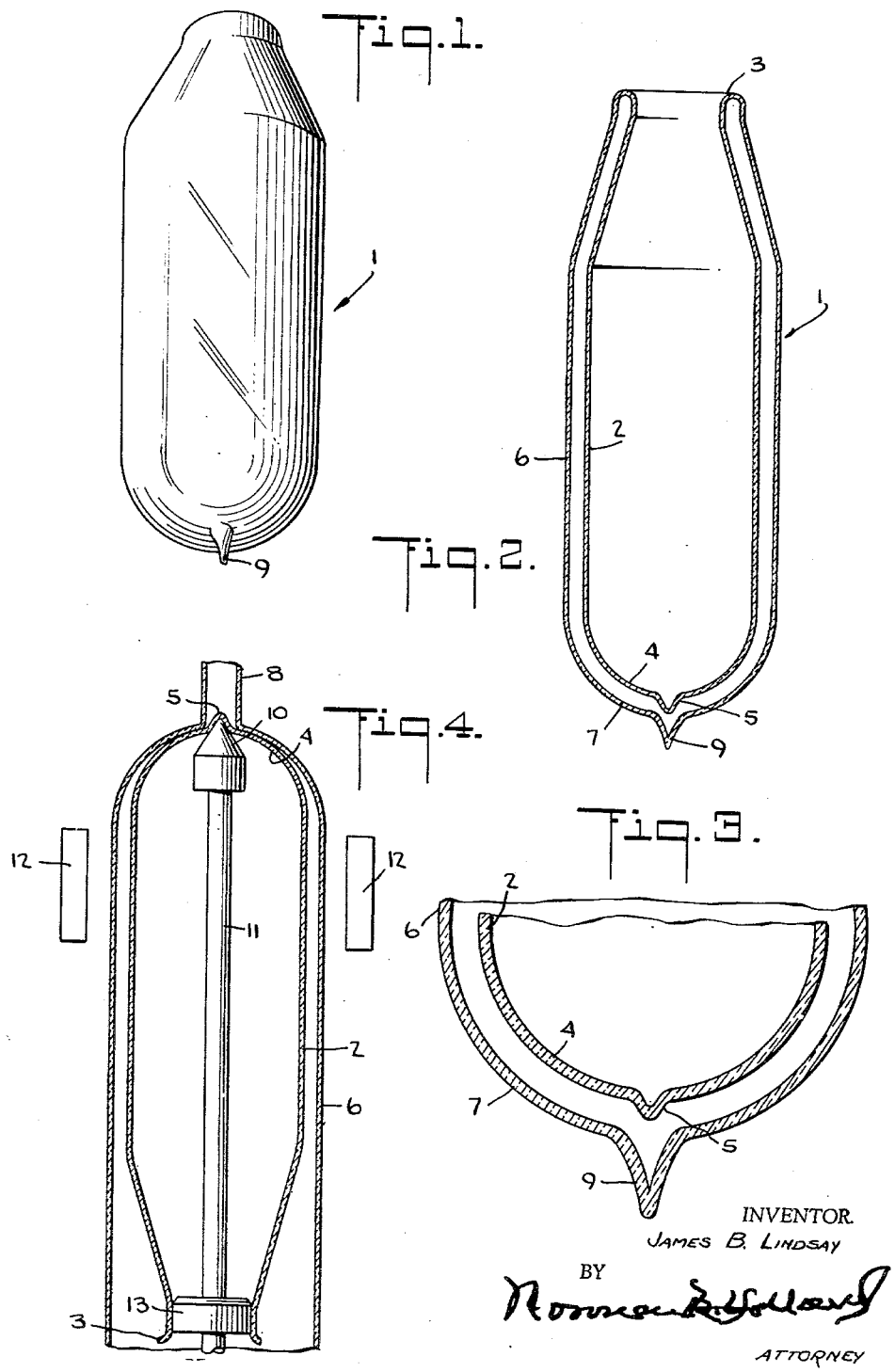
INVENTOR.
JAMES B. LINDSAY
BY
ATTORNEY

INVENTOR.
JAMES B. LINDSAY
BY
ATTORNEY

United States Patent Office 3,195,994
Patented July 20, 1965

3,195,994
METHOD AND MEANS OF PRODUCING
DOUBLE WALLED CONTAINERS
James B. Lindsay, Millburn, N.J., assignor to Kahle Engineering Co., Union City, N.J., a corporation of New Jersey
Filed May 22, 1962, Ser. No. 196,689
5 Claims. (Cl. 65—58)

The present invention relates to manufacturing a double walled container and more particularly to an improved method and means of manufacturing a double walled container such as a vacuum bottle filler and also to the improved filler manufactured by this method.

There are several known methods of manufacturing double walled glass containers and particularly vacuum bottles wherein the space between the walls is evacuated to minimize heat transmission through the walls of the container. These known methods use a variety of steps which are based generally upon a controlled spacing of separate glass shells and a subsequent welding or fusing operation to fasten adjacent portions of the two shells together. During the welding, it is necessary to accurately align the inner and outer shells to space one from the other by a predetermined distance generally uniformly over their entire surfaces.

Several methods have previously been used for this alignment and accurate over-all spacing. One of the more frequently used methods comprises the insertion of small spacing members between the inner and outer layers of the filler. These spacers are small rubber or plastic buttons attached to one or the other of the shells prior to the assembly and the welding operation. This use of spacers requires additional steps in the assembly and the presence of the spacers in the completed filler tends to reduce the efficiency of the insulation obtained in the completed filler. Another known method obtains the spacing by a relatively complicated synchronized spacing operation of the shell supporting or gripping members.

The method of the present invention provides for the alignment and spacing during the fusing step through a novel assembly method which eliminates the need for the shell spacers and which is readily adapted for high speed assembly operations on automatic sealing machinery.

Accordingly, an object of the present invention is to provide an improved method and means of manufacturing double walled containers.

Another object of the present invention is to provide an improved method of assembling the outer and inner shells of a double walled container.

Another object of the present invention is to provide an improved method and means for uniformily spacing all portions of the inner and outer shells of a double walled container.

Another object of the present invention is to provide an improved vacuum bottle filler and method of making it.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of a completed double wall container made in accordance with the present invention;

FIG. 2 is a vertical sectional view of a container in accordance with the present invention;

FIG. 3 is an enlarged detailed sectional view of the bottom portion of the container of FIG. 2;

FIG. 4 is a vertical sectional view illustrating the first step of the container shell spacing method in accordance with the present invention.

Figure 5:
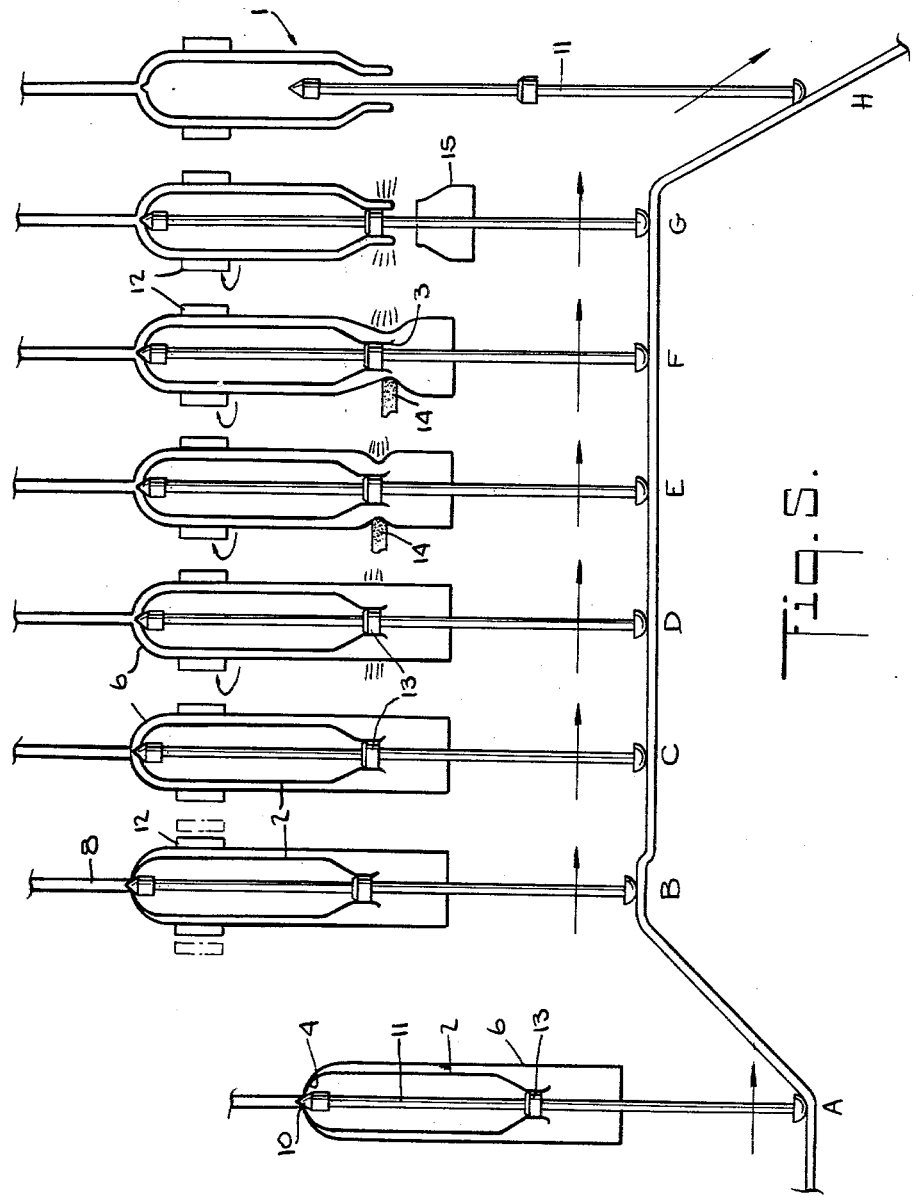
FIG. 5 is a diagrammatic view illustrating the method and means of manufacturing a double wall container in accordance with the present invention.

As illustrated in FIGS. 1 and 2, the improved container 1, which preferably is glass but which may be any other plastic material adapted for being molded and heat sealed, has an inner shell 2 with its upper or mouth portion 3 shaped as desired for the particular use intended. The lower portion or bottom of the inner shell 2 has a generally rounded shape as illustrated at 4 with an outwardly directed tip 5 formed at the center of the bottom portion 4.

The outer shell 6 is made slightly larger than the inner shell 2 and is shaped to provide space between the walls of the assembled container. The bottom 7 of the outer shell is rounded inwardly along the general curvature described by the inner shell 2 and in the completed form the outer shell 6 has its air exhaust tube 8 (FIG. 4) tipped off as indicated at 9 (FIG. 3) after the space between the shells 2 and 6 is evacuated. The tip 9 may be located at other portions of the outer shell 6 but when centered as illustrated it is best located for evacuation and tipping on automatic rotary machinery.

FIG. 3 illustrates a preferred shape for the tip 5 of the inner shell 2 and this shape is used to facilitate the centering and spacing steps in the novel assembly method. The tip 5 is provided to center the inner shell 2 with respect to the outer shell 6 during the assembly operation and for this purpose it comprises a generally conical shape dimensioned to engage the complementary shape of the tip 10 of a mandrel 11 in the assembly operation which will be described below.

The conical shape of the outwardly directed tip 5 permits it to engage a complementary conical tip 10 on the mandrel 11 and acts as a positive centering means when thus engaged to move the inner shell 2 to a centered position and to maintain it in this position during the subsequent steps in the assembly operation. In a typical double walled container such as a filler for vacuum bottles, the inner and outer walls are spaced apart as much as about one-quarter of an inch. This permits the tip or indentation 5 to extend outwardly one-eighth of an inch or more. A one pint filler for a vacuum bottle is typically about two to three inches in diameter and a generally conical tip having a diameter at its base of about one-quarter of an inch has been found to provide a satisfactory centering and retaining action with a height of from about one-eight of an inch to about 3/16 of an inch. While the preferred centering and position retaining action is facilitated by a generally conical shape for the tip 5, the dimensions of the tip 5 may be varied in accordance with the container size and the particular shell spacing being used.

As seen in FIGS. 4 and 5, the first step of the operation comprises placing the inner shell 2 and the outer shell 6 in nested and engaging relationship on the mandrel 11 at position A (FIG. 5) with the upper tip 10 of the mandrel 11 engaging the tip 5 of the inner shell 2 and with the bottom 4 of the inner shell 2 engaging the adjacent portions of outer shell 6. The ring 13 positions the mouth 3 of the inner shell 2. Thereafter, separate supporting means for the outer shell 6 such as gripping jaws 12 are positioned adjacent the outer shell 6 such as by raising the mandrel 11 upwardly to position B at which the outer shell 6 is gripped and positioned by jaws 12. The jaw members 12 grip the outer shell 6 to hold it thereafter at a constant level. At position C, the mandrel 11 is lowered a predetermined distance with respect to the outer shell 6 which remains gripped by jaws 12. This spaces the inner shell 2 a fixed distance downwardly from the outer shell 6. Since the inner shell 2 and the outer shell 6 are in contact when the outer shell 6 is gripped by the jaws 12, the continued fixed position of the outer shell 6 in jaws 12 and the controlled lowering of the inner shell 2 by mandrel 11 results in a fixed and predetermined spacing between the inner and outer shells regardless of minor variations in the shape of the outer shell. The ring 13 on the mandrel 11 engages and positions the mouth 3 of the inner shell 2.

The inner shell 2 and the outer shell 6 are now aligned in the inverted position illustrated at position D with the inner shell 2 being centered with respect to the outer shell 6 by the engagement of the mandrel tip 10 with the tip 5 provided at the center of the bottom 4 of the inner shell 2 and by ring 13. Heat is now applied to the shell 6 and mandrel 11 and jaws 12 are rotated to rotate shells 2 and 6 while the outer shell 6 is gently forced inwardly by a suitable tool 14 into engagement with the mouth 3 of the shell. During this sealing operation at stations E, F and G, space is maintained between the inner and outer shells by the mandrel 11, the outer shell gripping jaws 12, and the inner shell support 13.

After the completion of the fusing of shells 2 and 6 and the severing of the collet 15 by the flames at position G, the mandrel 11 is withdrawn from the connected shells and the container 1 is removed from supporting jaws 12 for suitable annealing, evacuating and other subsequent operations.

It will be seen that the present invention provides an improved method and means for assembling double walled containers. The method and means are particularly adapted for automatic assembly and are also particularly adapted for high speed machinery due to the unique and simplified means suitable for carrying out the novel assembly method. The method and means also produce an improved double walled container by eliminating the spacing elements such as are now used between the double walls of typical vacuum bottle fillers. The presently used spacers increase the manufacturing cost of double walled containers and also provide a conduction path for heat loss.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of manipulating an inner shell and a larger outer shell each having one end open and the opposite end at least substantially closed to form a double walled container having spaced apart inner and outer side walls and spaced apart end walls comprising the steps of positioning the shells with their open ends downwardly and with the inner shell within the outer shell and with their side walls spaced and the end walls in contact with one another, supporting the shells by engaging the end wall of the inner shell at about its center, thereafter engaging the outer shell with a separate support, providing relative motion between the supports equal to said end wall spacing in a direction to separate the end walls of the shells from one another, and thereafter attaching adjacent portions of the open ends of the shells.

2. The method of manipulating an inner shell and a larger outer shell both having one open end and having the opposite end an at least substantially closed end walls with the end wall of the inner shell including an inwardly opening detent at its center to form a double walled container having spaced apart inner and outer side walls and spaced apart end walls comprising the steps of positioning the shells with their open ends downwardly and with the inner shell within the outer shell and with their side walls spaced and the end walls of the shells in contact with one another, supporting the shells by engaging the indent in the end wall of the inner shell, thereafter engaging the outer shell with a separate support, moving the supports in a direction to separate the end walls of the shells a distance equal to said end wall spacing, and thereafter attaching adjacent portions of the open ends of the shells.

3. The method of manipulating an inner glass shell and a larger outer glass shell both having one end open and having the opposite end an at least substantially closed end wall with the end wall of the inner shell including an inwardly opening detent at its center to form a double walled container having spaced apart inner and outer side walls and spaced apart end walls comprising the steps of positioning the shells with their open end downwardly and with the inner shell within the outer shell and with their side walls spaced and end walls in contact with one another, supporting the shells by engaging the indentation in the end wall of the inner shell by a first support, raising the support thereby raising both shells, thereafter engaging the outer shell with a separate support, lowering the support engaging the detent a distance equal to said end wall spacing whereby the end walls of the shells are spaced from one another, and thereafter fusing adjacent portions of the open ends of the shells.

4. Means for manipulating an inner shell and a larger outer shell each having one end open and the opposite end at least substantially closed to form a double walled container having spaced apart inner and outer side walls and spaced apart end walls comprising the combination of first support means for supporting the shells with their open ends downwardly and with the inner shell within the outer shell and with their side walls spaced and their end walls in contact with one another, second support means for independently engaging the outer shell, means for increasing the spacing of the said support means and spacing the end walls a distance equal to said end wall spacing, and means for thereafter attaching adjacent portions of the open ends of the shells.

5. Means for manipulating an inner shell having one open end and having an inwardly opening indentation in its opposite end wall and a larger outer shell having one end open and the opposite end at least substantially closed to form a double walled container having spaced apart inner and outer side walls and spaced end walls comprising the combination of first support means having a generally conical shell engaging tip for engaging said indentation and for supporting the shells with their open ends downwardly and with the inner shell within the outer shell and with their side walls spaced and their end walls in contact with one another, second support means for independently engaging the outer shell, means for increasing the spacing of the said support means and spacing the end walls a distance equal to said end wall spacing, and means for thereafter attaching adjacent portions of the open ends of the shells.

References Cited by the Examiner

UNITED STATES PATENTS

| | | | |
|---|---|---|---|
| 1,004,259 | 9/11 | Higbee | 65—58 XR |
| 1,906,315 | 5/33 | Davis et al. | 65—133 XR |
| 2,336,874 | 12/43 | Louden et al. | 65—58 |
| 2,348,823 | 5/44 | Kirchheim | 65—58 |
| 2,817,452 | 12/57 | Bramming | 215—13 |
| 2,893,584 | 7/59 | Parker | 215—13 |

DONALL H. SYLVESTER, *Primary Examiner.*

EARLE J. DRUMMOND, *Examiner.*